United States Patent
Fenger

(10) Patent No.: US 9,115,693 B2
(45) Date of Patent: Aug. 25, 2015

(54) DEVICE FOR ESTABLISHING ADMITTANCE AND TRANSPORT OF CARGO TO AND FROM A WIND TURBINE CONSTRUCTION ABOVE GROUND LEVEL

(75) Inventor: Per E Fenger, Terndrup (DK)

(73) Assignee: Liftra IP ApS, Aalborg SV (DK)

( * ) Notice: Subject to any disclaimer, the term of this patent is extended or adjusted under 35 U.S.C. 154(b) by 118 days.

(21) Appl. No.: 13/505,083

(22) PCT Filed: Oct. 28, 2010

(86) PCT No.: PCT/DK2010/050289
§ 371 (c)(1),
(2), (4) Date: Apr. 30, 2012

(87) PCT Pub. No.: WO2011/050812
PCT Pub. Date: May 5, 2011

(65) Prior Publication Data
US 2012/0217089 A1    Aug. 30, 2012

(30) Foreign Application Priority Data
Oct. 28, 2009  (DK) .................................. 2009 01164

(51) Int. Cl.
*F03D 11/04* (2006.01)
*F03D 1/00* (2006.01)

(52) U.S. Cl.
CPC ........... *F03D 1/003* (2013.01); *F05B 2240/916* (2013.01); *Y02E 10/728* (2013.01)

(58) Field of Classification Search
CPC .................................. F03D 1/005; F03D 1/003
USPC ............... 182/10, 11, 141, 142, 143, 147, 2.1
See application file for complete search history.

(56) References Cited

U.S. PATENT DOCUMENTS

| | | | | |
|---|---|---|---|---|
| 2,670,890 A | * | 3/1954 | Hodge | 182/10 |
| 4,392,574 A | * | 7/1983 | Theyskens | 212/225 |
| 4,474,263 A | * | 10/1984 | Christopher | 182/10 |
| 5,048,172 A | * | 9/1991 | Gravenhorst | 29/401.1 |
| 8,640,340 B2 | * | 2/2014 | Foo et al. | 29/897.33 |
| 2006/0151767 A1 | * | 7/2006 | Wobben | 254/334 |
| 2006/0175465 A1 | * | 8/2006 | Teichert | 244/33 |
| 2007/0290426 A1 | * | 12/2007 | Trede et al. | 269/1 |

(Continued)

FOREIGN PATENT DOCUMENTS

EP    1 239 150 A2    9/2002
WO    2005/064152 A2    7/2005

(Continued)

*Primary Examiner* — Alvin Chin-Shue
*Assistant Examiner* — Kristine Florio
(74) *Attorney, Agent, or Firm* — Roberts Mlotkowski Safran & Cole, P.C.; David S. Safran

(57) ABSTRACT

A device for establishing admittance and transport of cargo to and from a wind turbine construction above ground level and having a part which can be raised and/or lowered by wires and winches located at ground level and connected with snatch blocks attached to a part so that it can be raised and/or lowered in relation to the construction. The part has a number of travelling crabs according to the numbers of winches and the travelling crabs are guided of the wires between the winches and the snatch blocks, and that the part with the travelling crabs is displaced upwards or downwards by the wires. Advantageously, the wires are used for both hoisting the part and as guide for the travelling crabs.

15 Claims, 9 Drawing Sheets

(56) References Cited

U.S. PATENT DOCUMENTS

| | | | |
|---|---|---|---|
| 2008/0265227 A1* | 10/2008 | May | 254/334 |
| 2010/0028152 A1* | 2/2010 | Numajiri et al. | 416/146 R |
| 2010/0101086 A1* | 4/2010 | Amram | 29/889.1 |
| 2010/0139062 A1* | 6/2010 | Reed et al. | 29/23.51 |
| 2010/0254813 A1* | 10/2010 | Dawson et al. | 416/146 R |
| 2011/0140724 A1* | 6/2011 | Olson et al. | 324/722 |
| 2012/0266796 A1* | 10/2012 | Roodenburg et al. | 114/61.14 |

FOREIGN PATENT DOCUMENTS

| | | | |
|---|---|---|---|
| WO | 2006/053554 A2 | 5/2006 | |
| WO | WO 2010024510 A1 * | 3/2010 | F03D 1/00 |

* cited by examiner

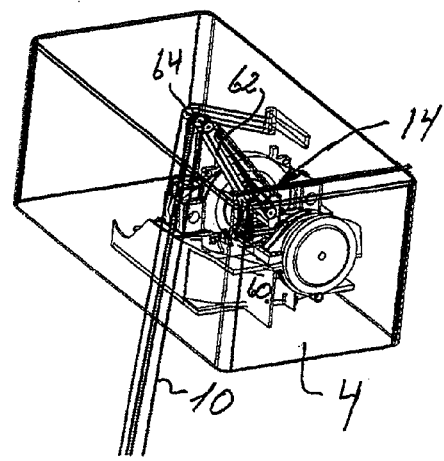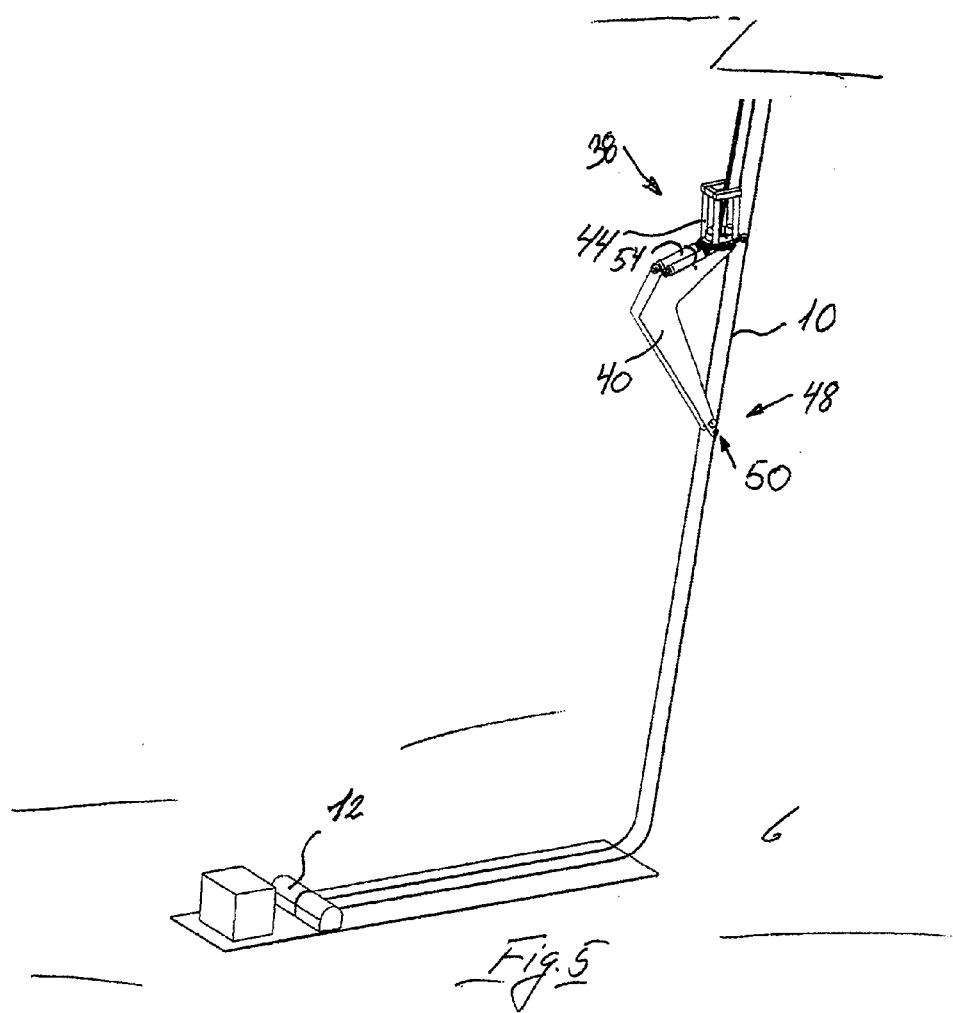
Fig. 5

DEVICE FOR ESTABLISHING ADMITTANCE AND TRANSPORT OF CARGO TO AND FROM A WIND TURBINE CONSTRUCTION ABOVE GROUND LEVEL

BACKGROUND OF THE INVENTION

1. Field of the Invention

The present invention relates to a device for establishing admittance and transport of cargo to and from an above ground level wind turbine construction and comprising a part that can be raised and lowered and/or lifted relative to the wind turbine construction, said part comprising at least two synchronically driven winches with cables/wires located at ground level, and a number snatch blocks according to the numbers of winches to be attached to a part of the wind turbine construction above ground level, a number of travelling crabs according to the numbers of winches, the travelling crabs comprising at least a first upper wheel and a second lower wheel.

2. Description of Related Art

The need to be able to perform efficient and swift inspection of blades on wind turbines, or to be able to transport relatively heavy cargo from ground level or cargo arranged on lorries at ground level to the nacelle on wind turbines, in an relatively easy manner, has in recent years increased with the number of electricity producing wind turbines. Building of wind turbines having en increased production capacity creates the need for an increasing blade length on the wind turbines, with a resulting need for towers that are correspondingly higher.

Sometimes replacement of parts in the nacelle is needed in connection with the performance of maintenance work and which entails the need for lifting relatively heavy items (28-30 tons) from ground level to the nacelle, which can be located more than 100 m above ground level for larger wind turbines. Lifting of such large and heavy loads leads to the need for large, ground level, mobile crane units which are relatively expensive, whereby the costs of maintenance and repair work will be relatively large. Furthermore, the use of mobile crane units is not optimal because the length of the extension arm (pole) leads to some instability during lifting of said heavy items.

However, to compensate for this, there are known cranes which are hoisted up from ground level and are attached in special furnished anchorage facilities on the lower side of the nacelle, whereby the handling of heavy objects is eased considerably. However, such cranes leave the task of transporting heavy objects from a ground level to a level within the reach of the said cranes anchored in the nacelle.

From International Patent Application Publication WO 2006/053554 A2, a device is known for use in mounting and dismounting wind turbine blades comprising at least one guide element extended between the nacelle and ground level and at least one suspended carrying device in a guide connected with a winch, for lifting a part of the wind turbine blade during the transport thereof between ground level and the mounting location on the shaft of the wind turbine, and at least one length adjustable backstay between the carrying device and the wind turbine blade. Thus, here, a guide, typically a steel wire, is used which guides the carrying device, as well as a common winch for performing the lifting of the wind turbine blade. The device is not suited for use in connection with inspection of blades mounted on a wind turbine.

In International Patent Application Publication WO 2005/064152 A2, a device is known for use for inspection of, e.g., blades on a wind turbine, comprising an endless frame with a guide arrangement suited for displacement along the surfaces of a wind turbine blade, the frame comprising a rail in which a gondola for inspection workers is displaceably suspended along the rail. The frame is displaced along the longitudinal axis of the wind turbine blade by a hoisting arrangement which is attached to the nacelle of the wind turbine or the shaft for a relevant wind turbine blade. This device is not suited for lifting heavy cargo, such as wind turbine blades, gearboxes for wind turbines, etc., but is solely suited for use in connection with manual inspection of wind turbine lades.

SUMMARY OF THE INVENTION

It is the object of the invention to indicate a device, which at the same time ensures good admittance conditions to the nacelle on a wind turbine, while it also is useable for transporting heavy cargo between ground level and the nacelle, and which is more simple in its design than the known lifting and inspection devices.

It is a further object of the invention to indicate a special design of the device which is useable for manual inspection of wind turbine blades.

A further object of the invention is that the device is mobile so that it is useable for more wind turbines and is thus suited for use performing inspection and maintenance works in wind turbine parks.

These objects are achieved by a device of the initially mentioned type in which the travelling crabs are guided by wires between winches and snatch blocks, and that a part with the travelling crabs is displaced upwards or downwards by said wires.

Hereby is achieved that the wires between the synchronous driven winches and the snatch blocks are used as guides/stays for the travelling crabs while the wires are used for raising and lowering the part between the ground level and the construction part on the wind turbine.

In the following, when a construction part on a wind turbine is mentioned, that typically refers to the nacelle on the top of the wind turbine tower which is dimensioned to endure very large torque forces from wind load on the blades on the wind turbine and the weight of gearboxes, shafts etc. arranged in the nacelle. The nacelle is thus assumed, as normally, to be provided with a number of suitable facilities for attachment of snatch blocks and crane for moving of heavy objects to be mounted and dismounted in the nacelle.

To ensure good stability of the device in use, the ratio between the extent of the device and facilities might be so aligned with the length of the travelling crabs, that the center of gravity of the platform is located between the first and the second wheel. This counteracts any risk of the part capsizing and losing its anchorage on the wires.

With the intent to ensure an adequate lifting capacity for the device according to the invention, the two outer snatch blocks may be in direct connection with the synchronously driven winches; likely the snatch blocks might be multi-tracked and the first front wheel of travelling crabs might be multi-tracked and interacting with the multi-tracked snatch blocks.

Hereby is achieved a considerably larger lifting capacity, as there is established an exchange which, for each extra track/extra interacting wire wheel in the snatch blocks and front wheel on the travelling crabs, reduces the necessary traction force from the synchronous driven winches by 50% for a relevant lift. However, this will demand that the length of the wires be accordingly longer, which will increase the time of transport between ground level and the nacelle, but not in a scale that is comparable with what a corresponding lifting with a mobile crane would be.

In a first preferred embodiment of the device according to the invention, the device comprises a platform set in an angled position in relation to the travelling crabs so that the platform is mainly horizontally oriented. This achieves a platform which is useable for transporting of heavy items and workers.

With the intent to enable compensation for oblique load situations of the platform, the angling position between the travelling crab and the platform may be continuously variable by a first actuator controlled via a control unit on the platform.

With the further intent to ensure that the center of gravity of the platform and a load arranged thereon is located inside the front and rear wheel on the travelling crabs, the platform may be sideways continuously variable displaceable in relation to the orientation of the wires by a second actuator controlled via a control unit on the platform.

With the intent to enable handling of heavy objects on the platform, at least one crane arm may be pivotally mounted on the platform. Hereby, it is possible to perform unloading and loading of items on the platform.

In a further preferred embodiment of the device according to the invention, the crane arm may comprise a gondola for one or more persons. Hereby, it is possible to use the device in connection with inspection of blades on wind turbines.

In a further preferred embodiment of the device according to the invention, the part may comprise a crane arrangement for transferring of heavy items between ground level or a transport vehicle and a location on the wind turbine, where the item can be reached by other handling means located in the nacelle of the wind turbine. For example, it is hereby achieved that the device may be used in connection with the exchanging of a gear box for a wind turbine, a shaft to a wind turbine, or other heavy parts belonging in a nacelle of a wind turbine.

In a further embodiment of the device according to the invention, the part may comprise a crane arrangement for lifting a blade for the wind turbine from ground level or a transport vehicle, to the attachment position for the blade on the shaft of the wind turbine.

In a further embodiment of the device according to the invention, wherein the snatch block is attached to a construction part in the nacelle, the part may comprise a crane arrangement with at least one crane arm and yaw unit, for mounting on a console arranged on a construction part in the nacelle on the wind turbine, and a device for attachment of a load in connection to the free end of the crane arm. It is hereby achieved that a crane is provided on/in the nacelle of the wind turbine which is capable of handling and operate with the parts of the wind turbine.

With the intent to ensure an optimal option for handling of heavy burdens, e.g., turbine parts to be added to or removed from the nacelle, the crane arm may be tiltably mounted by first bearing connections to the yaw unit, and tiltable by a hydraulic piston, the first end of which by second pivot connections is pivotally mounted to the yaw unit near its periphery and the second end of said piston being pivotally mounted by third pivot bearings to the crane arm in a level above the tiltable bearing of the crane arm.

By the tiltable mounting of the crane arm on the yaw unit, it is achieved that it is possible to swing the device to a position above the nacelle itself and attach a burden to the crane arm in a manner that lifting of heavy items in oblique positions is avoided. This will provide for a considerable increase of security for the workers exchanging heavy parts in the nacelle.

As the crane arm, for space reasons, cannot be fixedly mounted in the nacelle during operation with the wind turbine, it will be necessary to transport it from the ground level where the wind turbine is located, and for that purpose, on each side of the free end of the crane arm wheels/travelling crabs guided and resting on the wires may be provided. This has the advantage that the wire is useable for transportation of the crane arrangement for attachment to construction members in the nacelle of the wind turbine, after the snatch block has been attached to the nacelle.

With the intent to reduce the necessary traction force from the winches lifting a burden, the device for attachment of a load, e.g., a hook be suspended in a first block which is connected to the snatch block(s) by the wires, which again are connected with the winches on the ground, and that the loads are hoisted up and down by the winches between the nacelle and the ground level where the wind turbine is located.

To reduce the necessary traction force in the winches further, there might be located a second block between the first block and the snatch block(s), the second block cooperating with the first block. Hereby is achieved a considerable reduction of the necessary traction force of the winches to lift a burden depending on how many parts into which the block is divide.

With the intent to use the device according to the invention for more than one wind turbine, the device may be arranged to be mobile.

By the device according to the invention, there is thus disclosed a multifunctional device for establishing admittance and transport of cargo to and from a wind turbine construction above ground level, which enables inspection of the blades of the wind turbine and handling of heavy loads, and which also is mobile and relatively swift in establishing and operation, compared to the known devices and mobile cranes.

The invention is disclosed further in the following with reference to the accompanied drawings.

BRIEF DESCRIPTION OF THE DRAWINGS

FIG. 5 is a principle sketch of a further embodiment of the device according to the invention, where it comprises a crane arrangement during hoisting to the nacelle.

DETAILED DESCRIPTION OF THE INVENTION

Figure 1:
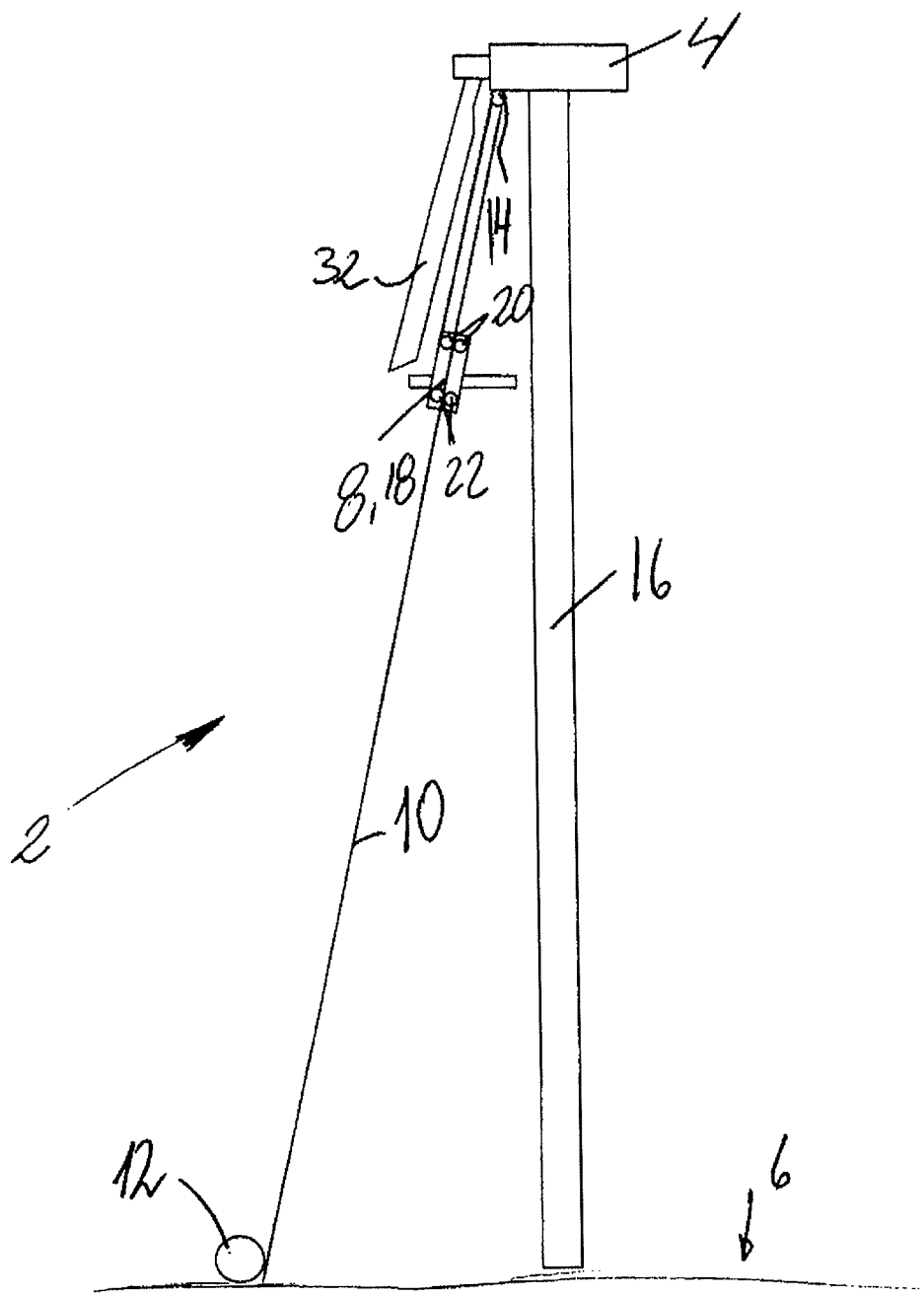
FIG. 1 is a principle sketch of the device according to the invention, arranged as a platform, connected with a nacelle on a wind turbine.

In FIG. 1 is disclosed a first embodiment of a device 2 for establishing admittance and transport of cargo to and from a wind turbine construction 4 above ground level 6.

The device 2 comprises in the disclosed embodiment a part 8, which in the shown embodiment consists of a platform, which can be raised or lowered and/or lifted in relation to the wind turbine construction 4.

Part 8 is connected via at least two cables/wires 10 to at least two synchronously driven winches 12 located at ground level 6, and a number of snatch blocks 14 equivalent with the numbers of winches are attached to the lower side of the wind turbine construction 4 which, in the illustrated embodiment, comprises a nacelle on a wind turbine tower 16.

The part 8 shown in FIG. 1 further comprises two travelling crabs 18, equivalent to the number of winches (two). The travelling crabs 18 comprise a first set of upper wheels 20 and a second set of lower wheels 22. The travelling crabs 18 are guided on the wires 10 between the synchronously driven winches 12 and the snatch blocks 14 while the platform 8 is displaced upwards and downwards by the wires 10.

The first set of upper wheels 20 on the travelling crabs may be multi-cut (not shown) and the snatch blocks which are suspended on the lower side of the nacelle 4, may also be multi-cut. By the multi-cutting is achieved a larger exchange (gear) when hoisting heavy burdens, so that the synchronously driven winches 12 do not necessarily have produce a traction force equivalent to that required to lift the burden of the part 8, including diverse friction losses by the lift, as the traction force is divided in relation to the present number of wires between the "cuts" in the travelling crabs 18 and the snatch blocks 14. In each cut, is located an extra wheel where the wires pass, and finally, the wires are connected with the synchronous driven winches at the ground level 6.

The location and extent of the part/platform 8 is adapted to the length of the travelling crabs 18 in a manner that the center of gravity of the platform 8 is located between the first wheel and the second wheel (20, 22).

Figure 3:
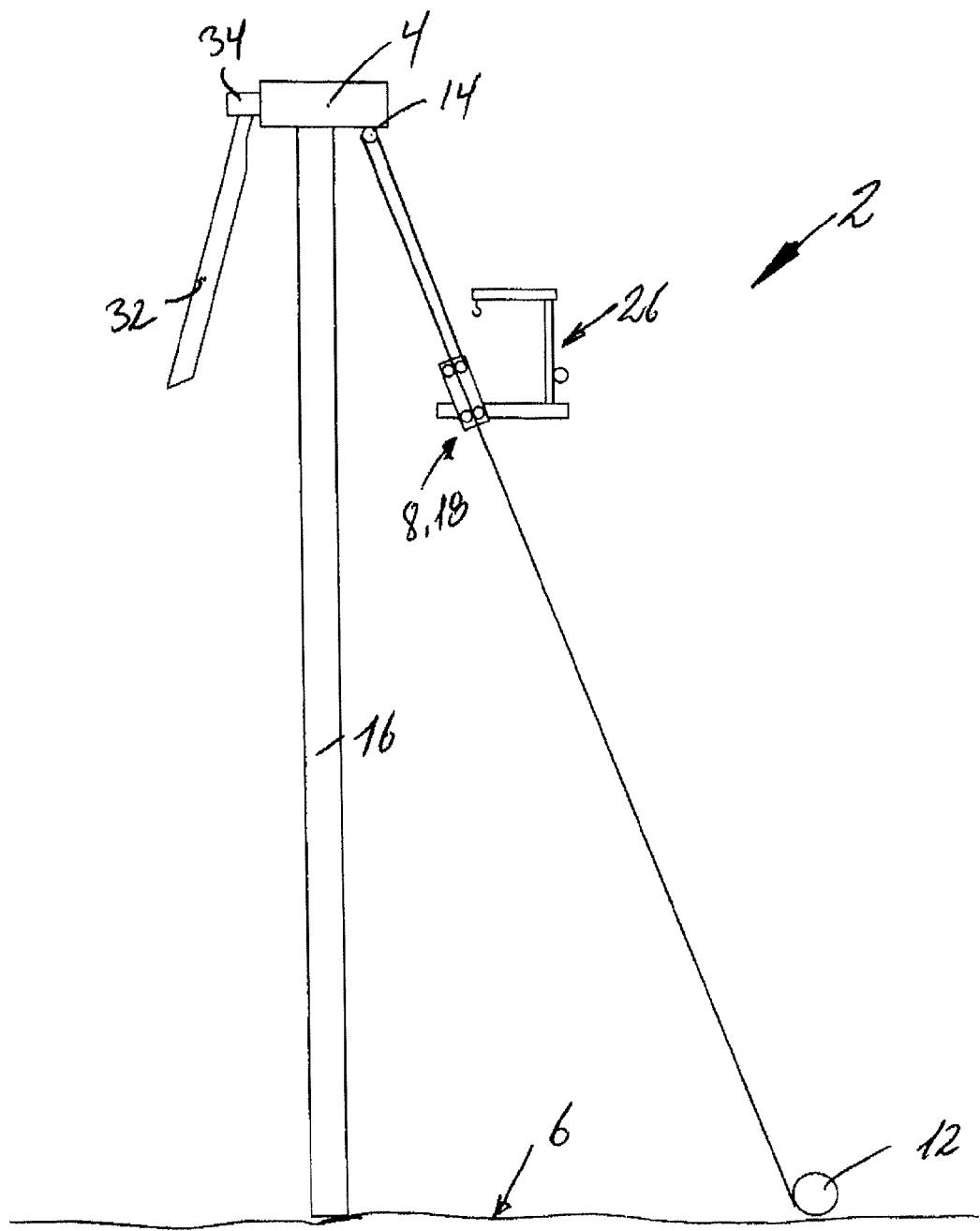
FIG. 3 is a principle sketch of the device according to the invention arranged as a platform with a crane, connected to a nacelle on a wind turbine.
Figure 4:
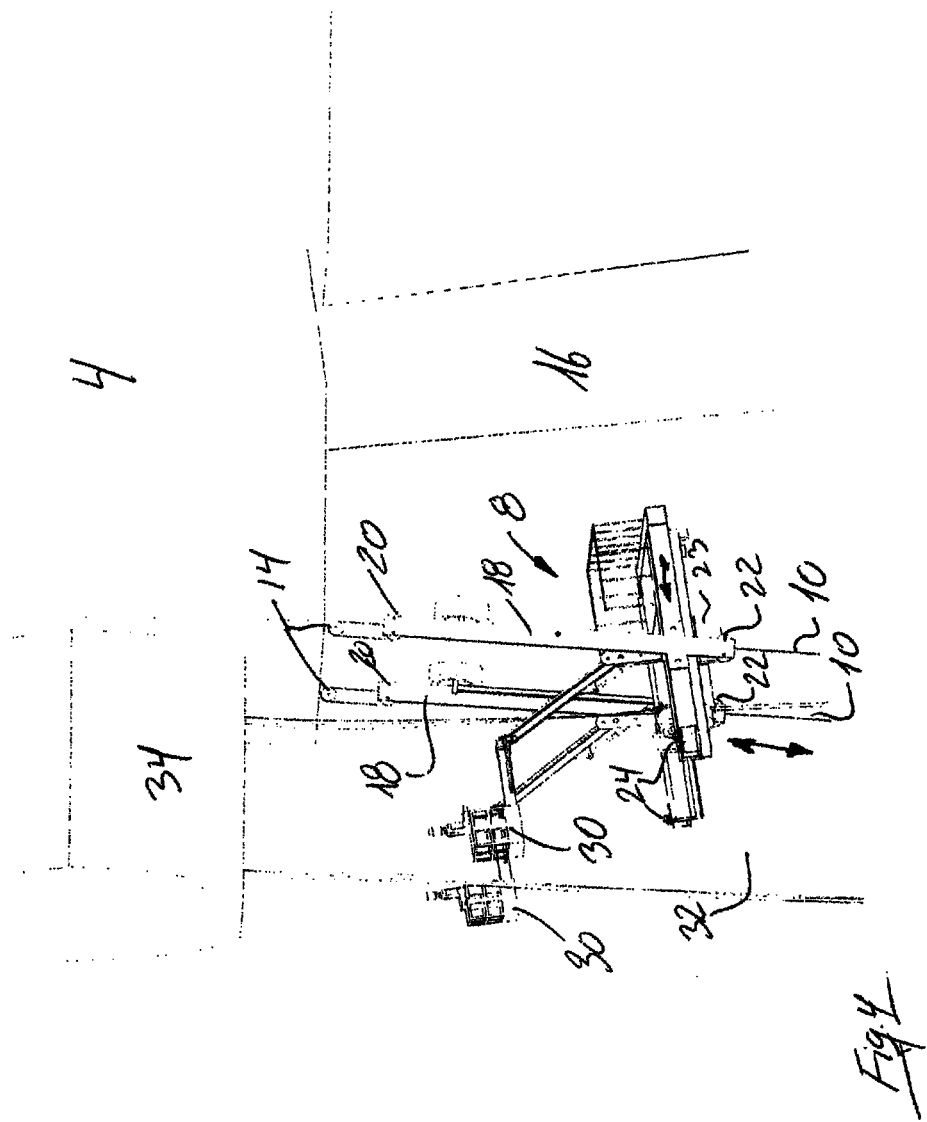
FIG. 4 is a detail view of the device according to the invention, arranged as a platform with crane arms with gondolas, during inspection of a wind turbine blade, connected to a nacelle of a wind turbine.

As it appears from FIG. 1, FIG. 3, and in particular, FIG. 4, the part/platform 8 is angled in relation to the travelling crabs 18 so that the part/platform 8 is oriented substantially horizontally. The angling between the travelling crabs 18 and the platform 8 is continuously variable by a first actuator 23 controlled via a control unit on the platform.

As it appears most clearly from FIG. 4 the platform is continuously variable displaceable in relation to the orientation of the wires by a second actuator 24 controlled via a not shown control unit on the platform. This enables compensating for variable load of momentum on the platform 8 during operation, and on the platform arranged items and loading equipment, e.g., as cranes 26, as it appears from FIG. 3. The cranes 26 may comprise a partitioned arm 28, 30 as it appears from FIG. 4, and at the end of the arms can be arranged a gondola 30 for one or more persons for use by manual inspection of a wind turbine blade 32. The crane(s) 26 may also be pivotally mounted to the part 8.

Figure 2:
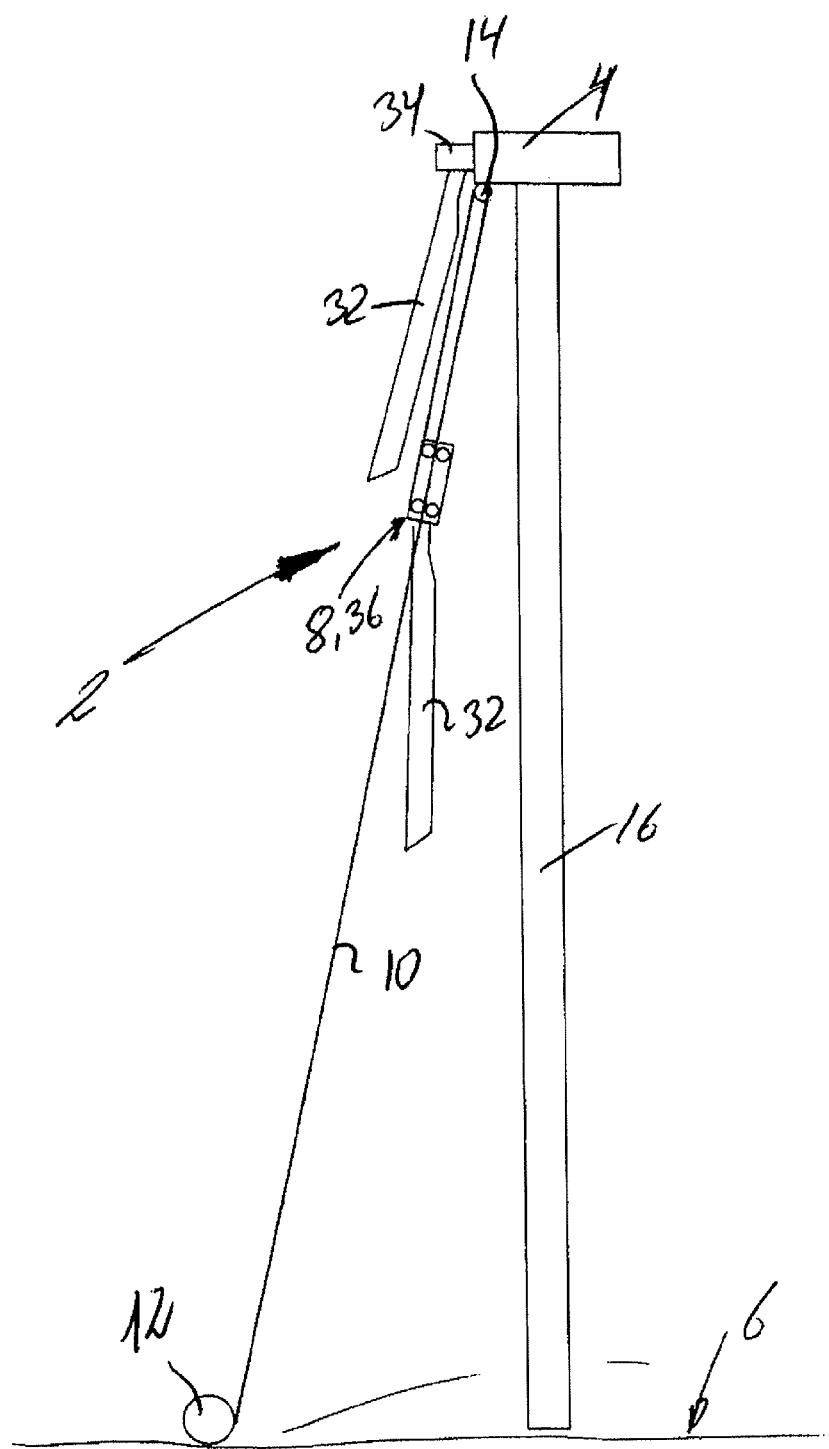
FIG. 2 is a principle sketch of the device according to the invention, arranged as a crane for hoisting heavy items, connected to a nacelle on a wind turbine.

As it appears from FIG. 2, the device according to the invention can be used as a crane arrangement 36 in connection with hoisting up a wind turbine blade 32 for mounting on a wind turbine shaft 34.

In FIG. 5 which is a principle sketch of a further embodiment of the device 2 according to the invention, where it consists of a crane arrangement 38 for temporary arrangement in the nacelle during maintenance and replacement of parts in the nacelle. As it appears from FIG. 5, but more clearly from FIG. 7 the crane arrangement comprises a crane arm 40 arranged on a yaw 42 which is arranged on a console 44 which is cooperating with console parts 46 being pre mounted on construction parts 60 in the nacelle 4. As it appears from FIG. 5 and more clear from FIG. 7, the free end 48 of the crane arm 40 on both sides wheels/travelling crabs 50 sliding/travelling on the wire 10 and accordingly controls the crane arrangements displacement on the wire 10 by the winch on the ground 6.

Figure 7:
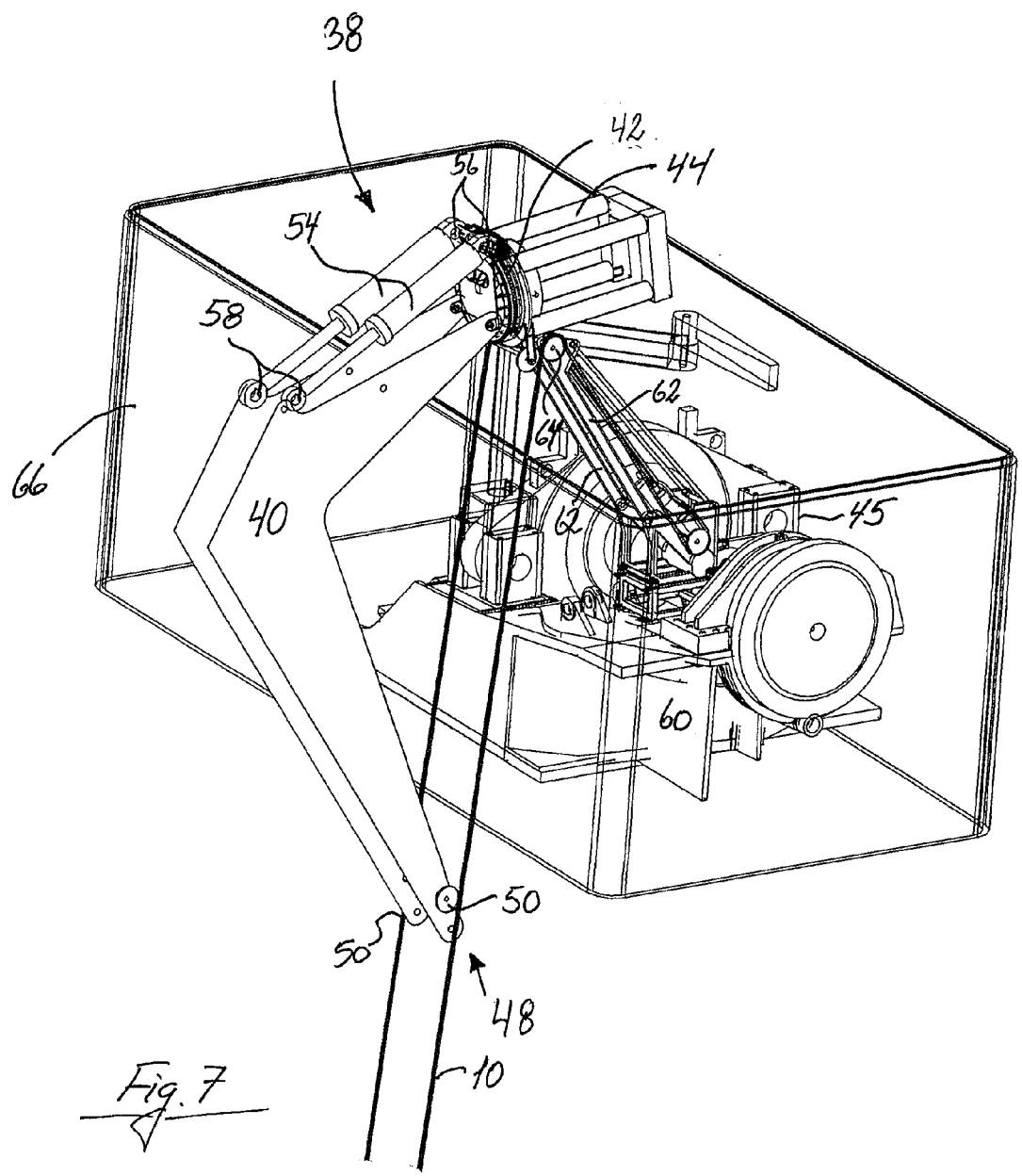
FIG. 7 shows the device according to the invention shown in FIG. 5 as a crane arrangement passing the wall of the nacelle.

As it further appears from FIG. 7 the crane arm 40 is pivotally mounted to the yaw 42 by first pivot connections 52, and the opposing side of the crane arm comprises hydraulic powered pistons 54 which by second pivot connections 56 and third pivot connections 56 are connected respectively to the yaw 42 and the crane arm 40, whereby the crane arm 40 becomes tiltable over the pivot connections 52 by activating the hydraulic powered pistons 54, which results in that the free end 48 of the crane arm is maneuverable above the nacelle 4, whereby it becomes possible to perform vertical oriented lifts of heavy items present in the nacelle 4.

Figure 6:
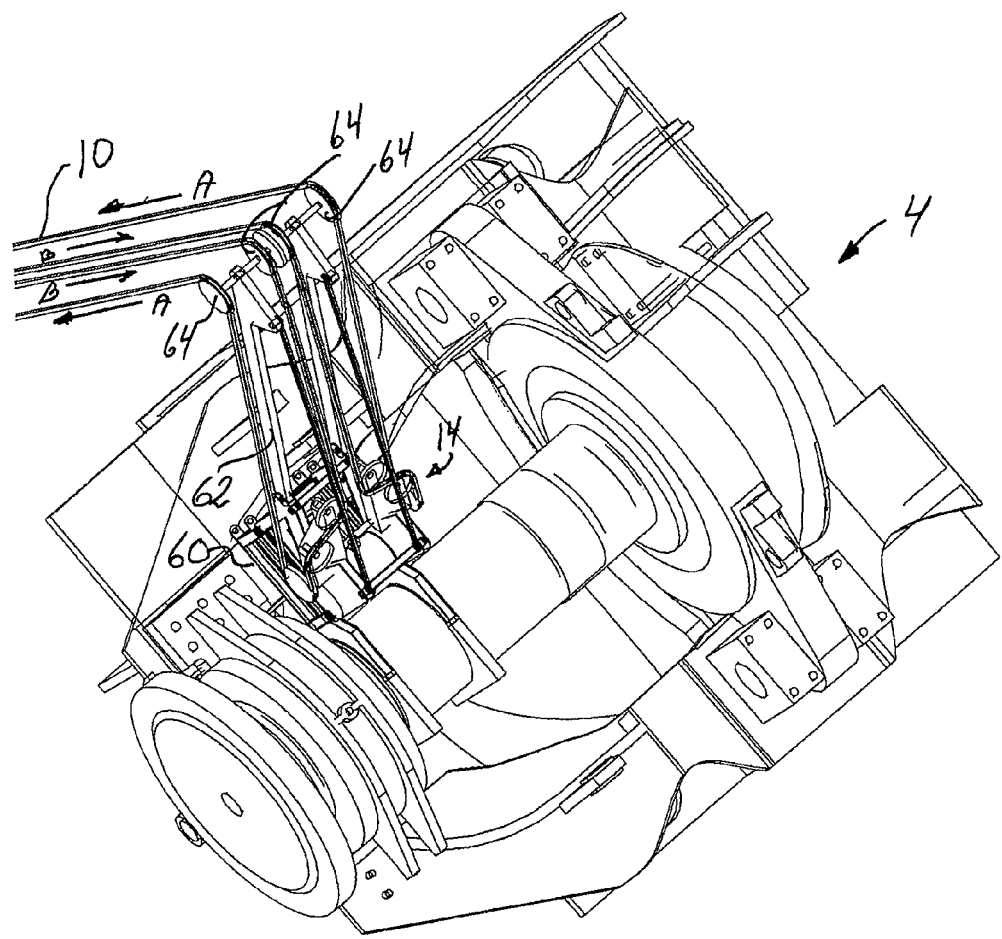
FIG. 6 is a detail perspective view of the nacelle without sides, with the snatch block attached to a construction member during hoisting up the crane arrangement shown in FIG. 5.

In FIG. 6 which is a detail perspective view of the nacelle without sides, shows the snatch block 14 attached to a construction member 60 during hoisting the crane arrangement shown in FIG. 5. Displacement of the wire 10 is indicated by the arrows A and B, where it appears that the wire at the arrow A is moving towards the winch 12 on the ground 6, and the wire at the arrows B is moving upwards towards the nacelle 4, against the snatch block 14 where the wire change direction to A. As it further appears from the shown embodiment of the device, the snatch block 14 comprises oblique upwards and outside the nacelle 4 protruding arms 62 on the free ends of which are arranged wheels 64 for guiding the wire 10.

In FIG. 7 is disclosed the crane arrangement 38 according to the invention, shown in FIG. 5, during passage of the wall 66 of the nacelle, where it passes over the wheels 64.

Figure 8:
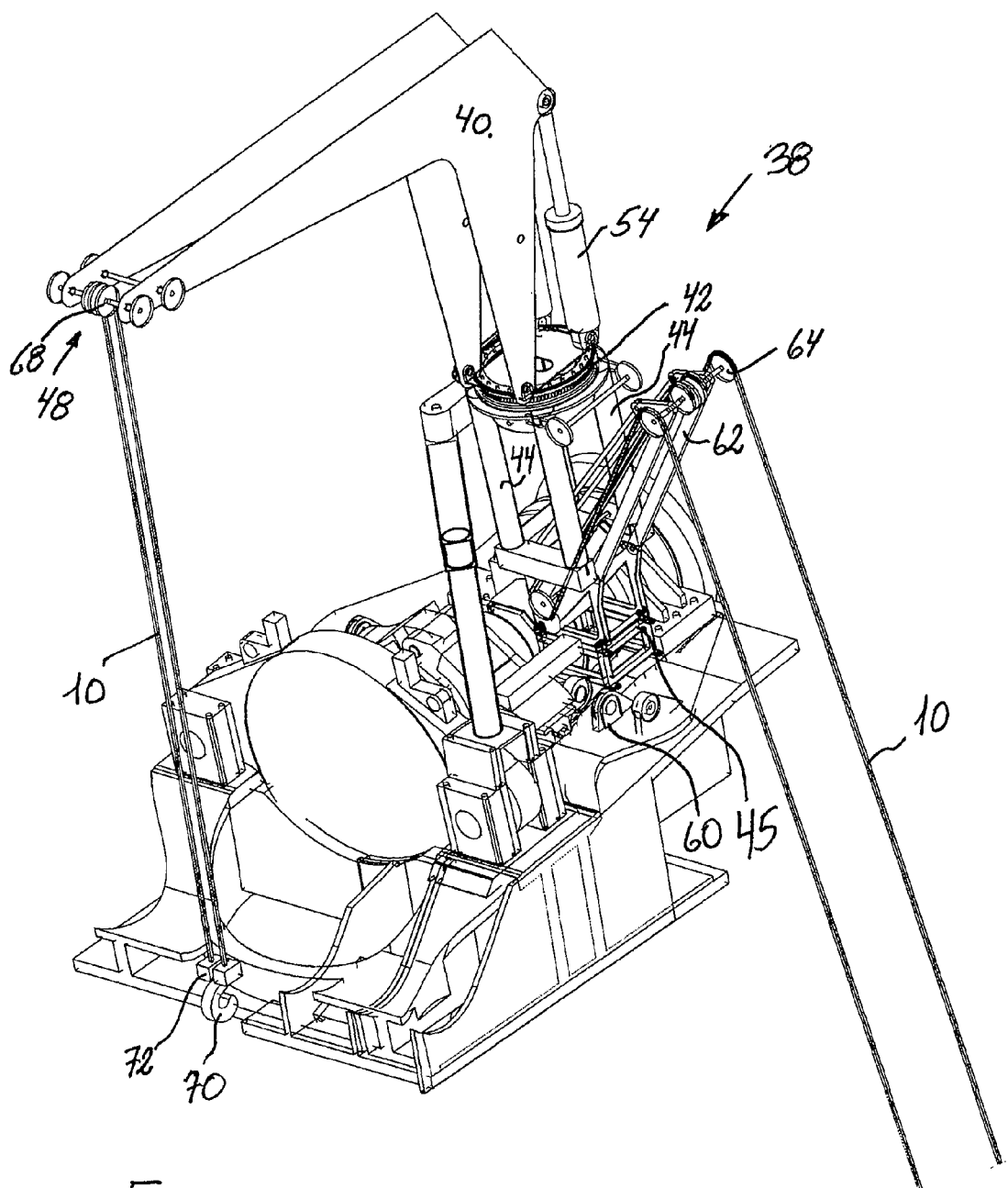
FIG. 8 shows the crane arrangement in FIG. 7 arranged on a console, mounted on construction members in the nacelle, ready for hoisting a burden.

In FIG. 8, the crane arrangement 38 shown in FIG. 7 is shown as being arranged and fastened to another console part 45 mounted on construction members 60 in the nacelle 4, ready to lift a burden. As it appears, the free end 48 of crane arm 40 is provided with a further wheel 68 for the wire 10, wherein there is suspended a device 70 for attachment of a burden. In the illustrated embodiment, the device comprises a crane hook 70 with a block 72 connected with the wire 10.

Figure 9:
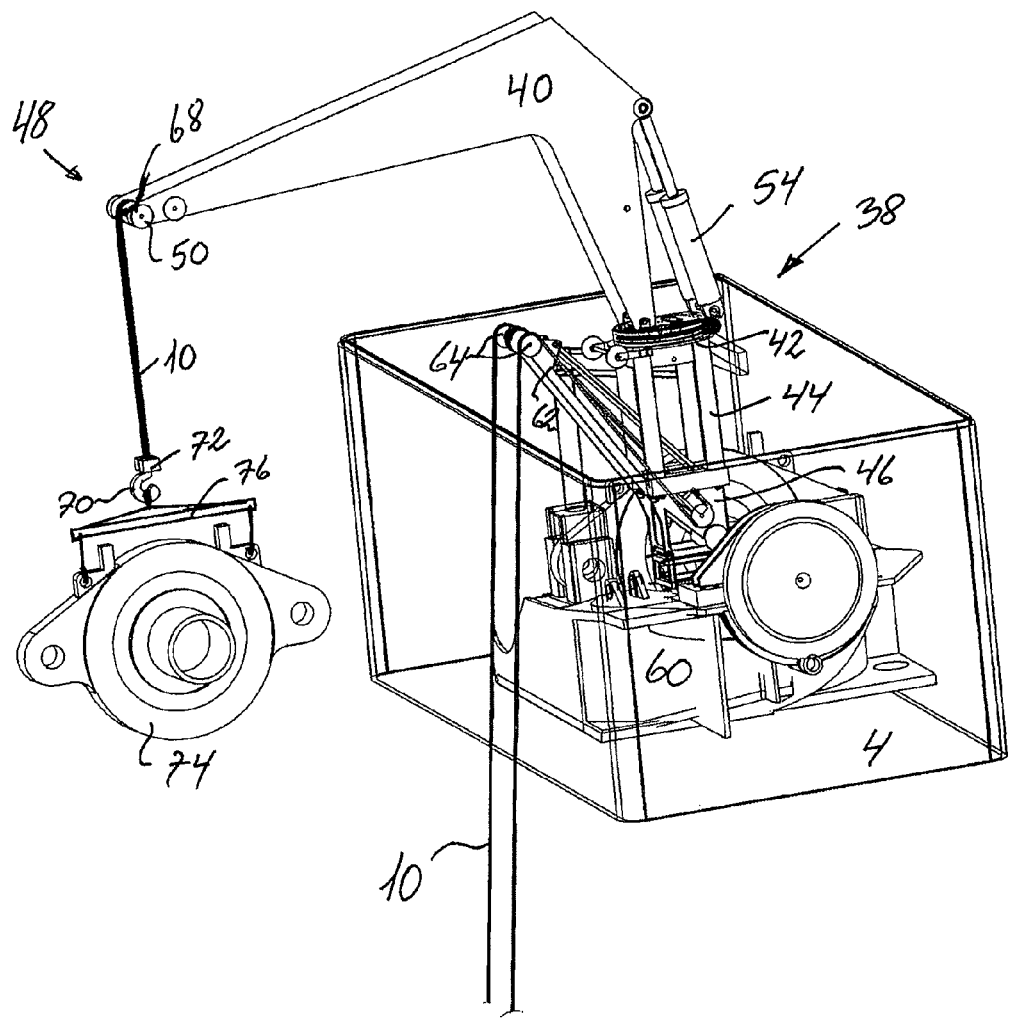
FIG. 9 shows the crane arrangement in FIG. 8 handling the gearbox of the wind turbine.

FIG. 9 shows the crane arrangement 38 of FIG. 8 hoisting a wind turbine gear box 74, where the gear box is suspended in a yoke 76 connected to the crane hook 70.

The device 2 according to the invention may further be arranged on wheels, for example, on a flat bed truck or a trailer (not shown), whereby the device becomes mobile, and accordingly easier to utilize for more wind turbines.

The device 2 is intended to be used in the following manner. The device is brought in position below the nacelle 4, and a minor winch, located in the nacelle is used to lift the snatch blocks 14 for attachment to attachment means on the lower side of the nacelle, or a construction member 60 inside the nacelle 4. The device 2 is subsequently moved to a preferred position in relation to the tower 16 of the wind turbine, or inside the nacelle 4 in a manner that the wires 10, for example, are parallel with a wind turbine blade 32, and the platform with gondolas 30 mounted on the crane arms 28, 30 are displaced along the blade surfaces, without being support on the blade surface, on the wires 10 by activating the synchronously driven winches 12.

When inspection of the wind turbine blades 32 is not required, but service/replacement of parts in the nacelle 4 is to be performed, the synchronously driven winches 12 advantageously can be arranged on the side of the nacelle 4 opposite the wind turbine blades 32 of the wind turbine, as it appears from FIG. 3, where the part/platform 8 is provided with a crane for lifting burdens.

When hoisting a wind turbine blade up or down, as indicated in FIG. 2, the platform on the part 8 is replaced with holding means for a wind turbine blade 32 to be mounted on the shaft 34 of wind turbine.

In a further embodiment of the device 2, where it is used together with a crane arrangement 38 for location in the nacelle 4, the first console part 44 of the crane arrangement is attached on the second console part 45 which is mounted on a construction member 60 in the nacelle 4, and subsequently, the winch 12 is activated whereby the block 72 on the end of the crane hook is hauled to attach with the free end 48 of the crane arm 40 which forms a counter hold for the block 72. By continued traction in the wire 10, the crane arrangement 38 will be displaced relative to the nacelle 4, as it appears from FIG. 5 and FIG. 7. The crane arrangement 38 passes finally the wall 66 of the nacelle, and with the first console part 44 in front ready for attachment on the second console part 45 which is attached to a construction member 60 in the nacelle 4. After fastening the first console part 44 to the second console part 45, the crane arrangement 38 are ready for use, as the crane hook 70 connected with the block 72 can be raised and lowered hauling and slacking the wire 10 by the winch 12.

In a further embodiment, two crane arrangements 38 can be arranged in the nacelle, which enables handling of the shaft 34 of the wind turbine with the blades mounted which means that inspection and repair works can be performed when shaft and blades are lying on the ground surface.

What is claimed is:

1. A device for establishing admittance and transport of cargo to and from a wind turbine construction above ground level, comprising
    a part that can be raised and lowered relative to the wind turbine construction,
    at least two synchronously driven winches located at ground level in a side-by-side relationship,
    a plurality snatch blocks matched to the numbers of winches, the snatch blocks being attachable to a section of the wind turbine construction above ground level in a side-by-side relationship, cables or wires running between the winches and the snatch blocks, and
    a number of travelling crabs matched to the number of winches, each of said travelling crabs comprising at least one first upper wheel and at least one second lower wheel,
    wherein the travelling crabs are guided on the wires running between the winches and the snatch blocks,
    wherein said part is displaceable with the travelling crabs upwards or downwards by said wires, and
    wherein the wires run directly from at least an outermost of the snatch blocks to said travelling crabs and then directly from the travelling crabs to the synchronous driven winches, wherein the snatch blocks are multi-cut, and wherein the at least one first upper wheel of the travelling crabs is multi-cut and cooperates with said multi-cut snatch blocks.

2. The device according to claim 1, wherein the center of gravity of said part is located between the at least one first upper wheel and the at least one second lower wheel.

3. The device according to claim 1, wherein said part comprises a platform that is angularly positioned relative to the travelling crabs so that the platform is substantially horizontally oriented.

4. The device according to claim 3, wherein the angle between the travelling crab and the platform is continuously variable by a first actuator that is controlled via a control unit on the platform.

5. The device according to claim 4, wherein the platform is continuously variably displaceable sideways relative to the orientation of the wires by a second actuator that is controlled via a control unit on the platform.

6. The device according to claim 3, wherein the platform comprises at least one crane arm that is pivotally mounted on the platform.

7. The device according to claim 6, wherein the crane arm comprises a gondola that is able to accommodate at least one person.

8. The device according to claim 1, wherein the part comprises a crane arrangement for transferring heavy items between ground level or a transport vehicle, and a location on the wind turbine at which said items are reachable by handling means arranged on a nacelle of the wind turbine.

9. The device according to claim 1, wherein the part comprises a crane arrangement for lifting a wind turbine blade from ground level or a transport vehicle to a blade attachment location on a shaft of the wind turbine.

10. The device according to claim 1, where in the device is transportable.

11. A device for establishing admittance and transport of cargo to and from a wind turbine construction above ground level, comprising
    a part that can be raised and lowered relative to the wind turbine construction,
    at least two synchronously driven winches located at ground level,
    a plurality snatch blocks matched to the numbers of winches, the snatch blocks being attachable to a part of the wind turbine construction above ground level, cables or wires running between the winches and the snatch blocks, and
    a number of travelling crabs matched to the number of winches, said travelling crabs comprising at least one first upper wheel and at least one second lower wheel,
    wherein the travelling crabs are guided on the wires between the winches and the snatch blocks,
    wherein said part is displaceable with the travelling crabs upwards or downwards by said wires, and
    wherein the part comprises a crane arrangement with at least one crane arm having a yaw unit and a first console part, the first console part being mountable on a second console part arranged on a construction member in a nacelle of the wind turbine, and a device for attachment of a burden in connection with a free end of the crane arm.

12. Device according to claim 11, wherein the crane arm is tiltably mounted near a periphery of the yaw unit by first bearing connections and is tiltable by at least one hydraulic powered piston, a first end of the piston being pivotally connected near the periphery of yaw unit by second bearing connections located opposite the first bearing connections and a second end of said piston being pivotally mounted to the crane arm at a level above the first bearing connections by third bearing connections.

13. The device according to claim 11, wherein the free end of the crane arm, on each side, comprises travelling crabs guided on and resting on the wires.

14. The device according to claim 11, wherein the device for attachment of a burden is suspended in a first block connected with the snatch blocks by the wires.

15. The device according to claim 14, wherein a second block is arranged between the first block and the snatch blocks, said second block cooperating with the first block.

* * * * *